Jan. 22, 1946.　　M. D. DZAMA　　2,393,315

TOOL MOUNTING

Filed April 14, 1943

INVENTOR.
MICHAEL D. DZAMA.

BY Geo. B. Pitts

Patented Jan. 22, 1946

2,393,315

UNITED STATES PATENT OFFICE 2,393,315

TOOL MOUNTING

Michael D. Dzama, Cleveland, Ohio

Application April 14, 1943, Serial No. 483,002

6 Claims. (Cl. 279—6)

This invention relates to a tool mounting whereby the tool may be readily and accurately adjusted from time to time relative to its support for carrying out boring or other operations. As showing one application of my improvement in mounting, it is illustrated as adjustably supporting the tool of a boring mill, whereby the tool may be adjusted radially into operating position.

In an adjustable tool mounting for making precision cuts, some clearance must be made between the parts to permit of their assembly and relative adjustment. In a mounting embodying a large number of parts, the clearances therebetween are increased and result in making it difficult to accurately adjust the tool and rigidly secure it in the desired position to resist both radial and torque stresses. Accordingly, by reducing the number of parts of the mounting to the minimum, the total clearance between the parts is reduced, so that a greater degree of accuracy in adjustment and a saving of time result.

One object of the invention is to provide an improved tool mounting of simplified construction wherein one guide member for the tool carrying slide is formed integrally with the shank that is supported in the operating machine or mill.

Another object of the invention is to provide an improved mounting of this character capable of fixedly maintaining the shank of the tool in its adjusted position.

Another object of the invention is to provide an improved mounting of this character comprising few parts inter-related to simplify and economize their construction and permit of their ready assembly.

Another object of the invention is to provide an improved tool mounting of this character wherein the adjustment of the part or element which supports the tool shank, may be moved predetermined distances without danger of back-lash, whereby accurate setting of the tool with respect to the work is facilitated.

Another object of the invention is to provide an improved mounting of this character having a movable supporting member for the tool shank and guide walls therefor, certain of the guide walls being adapted to be flexed to increase friction between it and the supporting member.

Another object of the invention is to provide an improved tool which is of simplified construction having few parts adapted to be readily assembled and disassembled, the construction herein shown embodying certain improvements shown and claimed in my co-pending application Ser. No. 478,218, filed March 6, 1943.

Other objects of the invention will be apparent to those skilled in the art to which my invention relates from the following description taken in connection with the accompanying drawing, wherein.

Figure 1:
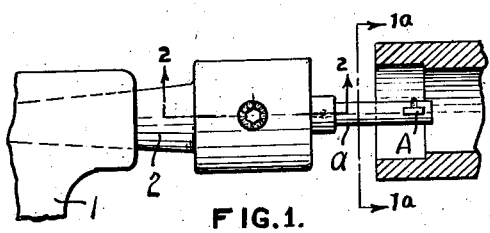
Fig. 1 is a side elevation of a mounting embodying my invention, with a tool supported therein and showing the operation of the latter for carrying out a boring operation.
Figure 1A:
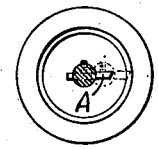
Fig. 1a is a section on the line 1a—1a of Fig. 1.
Figure 2:
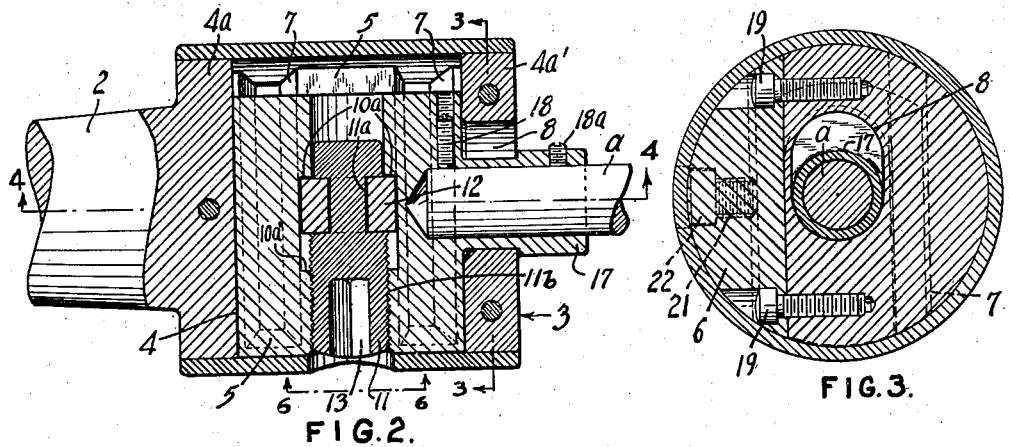
Fig. 2 is a section on the line 2—2 of Fig. 1.
Figure 3:
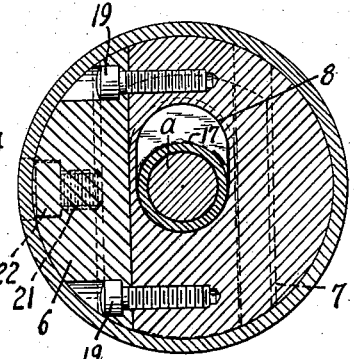
Fig. 3 is a section on the line 3—3 of Fig. 2.
Figure 6:
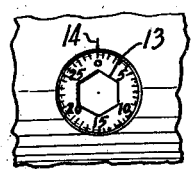
Fig. 6 is a fragmentary view on the line 6—6 of Fig. 2.

In the drawing, 1 indicates a tail stock of a boring mill arranged to receive the shank 2 forming part of a mounting for a tool A. The outer end of the shank 2 terminates in an integral head 3 having a base portion 3a the outer wall of which is preferably of curvilinear shape concentric to the axis of the shank 2. The upper portion of the base portion 3a intermediate its inner and outer ends is cut away or shaped to form a recess 4 extending at right angles to the axis of the shank 2, to accommodate a slide member 5, which carries the tool A as later set forth. The bottom wall 4' of the recess 4 is disposed in a plane parallel to but at one side of the axis of the shank 2 and the upper ends of the inner and outer side walls 4a, 4a' of the recess 4 terminate in a plane parallel to the axis of the shank 2 and bottom wall of the recess, but on the opposite side thereof of said axis, said side walls forming seats for the inner and outer ends of a combined guide and clamping member 6. The outer wall of the member 6 is preferably curvilinear being struck on a radius of the axis of the shank 2 equal to the radius of the outer wall of the base portion 3a. The bottom wall 4' of the recess 4 is formed with spaced parallelly related guide ways 7 extending at right angles to the shank 2 and preferably having side walls converging toward the outer wall of the base portion 3a, and the outer end wall 4a' of the base portion 3a is formed with a transversely extending elongated through opening 8 for a purpose later set forth. The bottom wall of the slide member 5 is provided with parallelly spaced keys or ribs 9 having a cross section complementary to and slidably engaging the guideways 7, whereas the top wall of the slide member 5 slidably engages the inner wall or face of the member 6. The slide member 5 is formed with a longitudinally extending opening 10, the axis of which cuts the axis of the shank 2, and intermediate its ends the opening 10 is enlarged laterally to form pairs of alined shoulders 10a, 10a' and vertically (as viewed in Fig. 2), so as to extend through the slide member 5, as shown at 10', to accommodate a bifurcated member 12. 11 indicates an adjusting element rotatably supported in the opening 10. The adjusting element 11 is formed intermediate its ends with an annular recess 11a to receive the bifurcations of the member 12, the latter being seated in engagement with the side walls of the recess 11a to prevent endwise movement of the element 11. One end portion of the adjusting element 11 is provided externally with screw threads 11b, which engage screw threads provided on the walls of the adjacent portion of the opening 10, whereas the opposite end portion of the element 11 is rotatably supported in the adjacent portion of the opening 10. One end portion of the adjusting element 11 (preferably that end portion which is externally threaded) is formed with an inwardly extending axially disposed opening 13 to receive a suitable tool (not shown) adapted to rotate it, such end being provided on its outer end face with designated graduations (see Figs. 1 and 6) to regulate its adjustment relative to a zero mark 14 which may be provided on a shell 15, as shown in Figs. 1 and 6.

The outer side portion of the slide member 5 is (a) formed with an opening 16, the axis of which is at right angles to the axis of the opening 10 and traverses a plane (when the slide member is moved) which intersects the axis of the shank 2 and (b) provided with a hollow boss 17 extending outwardly through the opening 8 in axial relation to the axis of the opening 16, the boss 17 and opening 16 forming a seat for the inner end of the tool shank a. Set screws 18, 18a, threaded through the end wall of the slide member 5 and side wall of the boss 17, respectively, serve to secure the shank a in its seat.

The pairs of alined shoulders 10a, 10a' overlap the opposite sides of the bifurcated member 12 for engagement therewith to limit the movement of the slide member 5 in either direction and are so spaced that (a) when the axis of the tool shank a is in axial relation to the axis of the shank 2 (see Fig. 2), the slide member 5 is at the limit of its movement in one direction, the alined shoulders 10a serving to stop the slide member 5 at this position when moved toward the left (as viewed in Fig. 5) and (b) when the slide member 5 is moved in the opposite direction the alined shoulders 10a' engage the member 12 to limit such movement. The outer end of the guide member 6 is secured to the outer end wall 4a' at opposite sides of the opening 8 by countersunk cap screws 19 and its inner end is secured to the inner end wall 4a by a countersunk cap screw 19a having a conical wall fitting a conical seat therein to insure proper positioning of the guide member 6.

Figure 4:
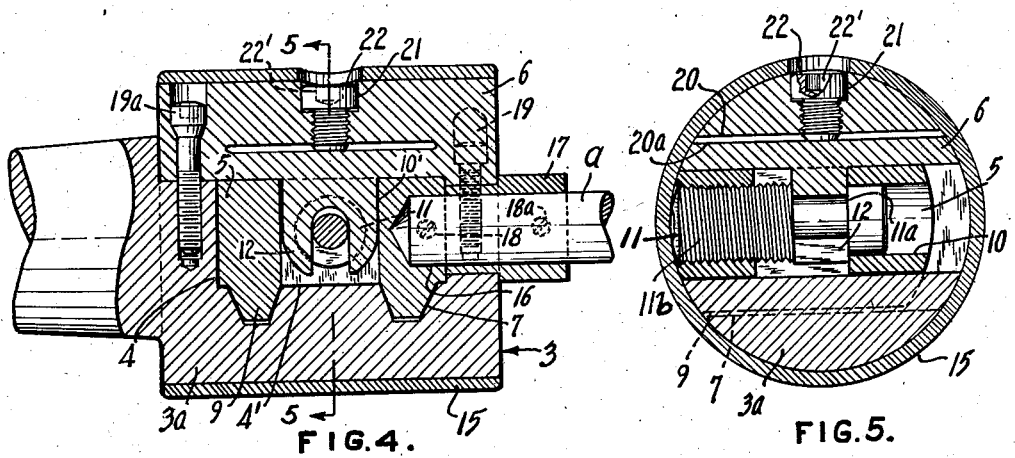
Fig. 4 is a section on the line 4—4 of Fig. 2.
Figure 5:
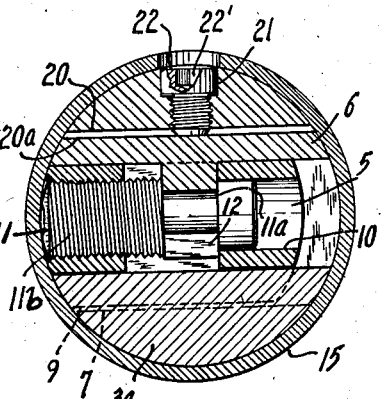
Fig. 5 is a section on the line 5—5 of Fig. 4.

As shown in Figs. 4 and 5, the guide member 6 is formed with a relatively wide through opening or slot 20 extending at right angles to the axis of the shank 2, the bottom wall 20a of the opening being normally parallel to the guide wall of the guide member and intermediate the side walls of the opening 20 and intermediate its opposite open ends, the guide member is formed with a through opening 21 leading from the opening 20 outwardly. The inner portion of the opening 21 is provided with screw threads arranged to receive a screw 22 which when tightened against the wall 20a serves to flex it sufficiently to clamp a portion of guide wall for the slide member 5 against the latter to lock the member in its adjusted position. By proper adjustment of the screw 22 so as to provide a limited amount of friction between the guide member 6 and slide member 5, (a) free movement of the latter is prevented, (b) sufficient torque must be applied to the screw 11 to overcome this friction in adjusting the slide member and (c) danger of the screw being turned short of or beyond the desired position is greatly reduced. The outer portion of the opening 21 is enlarged so that in using a cap screw to engage the wall 20a, its outer end or head will not project beyond the outer wall of the guide member 6.

It will be noted that the screw 11 is provided with right-hand screw threads, so that by turning it counterclockwise, the slide member may be adjusted from its normal position (Fig. 2) radially of the shank 2. Where the screw 11 is provided with left-hand screw threads, it is operated clockwise. As will be understood, the pitch of the screw threads on the operating member 11 has a predetermined relation to the graduations on its end face, whereby a predetermined angular movement of the member 11 determines a predetermined adjustment of the slide member 5.

The head of the screw 22 is formed with a non-circular opening adapted to take a suitable tool for turning it.

No claim is made herein to the subject-matter claimed in my co-pending application Ser. No. 478,218, filed March 6, 1943.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a tool mounting, the combination of a shank adapted to be supported in a machine and provided at its outer end with an integral guide wall extending at right angles to said shank, a separate guide wall fixed at its inner and outer ends to said first mentioned wall, a slide member slidably mounted between said walls, one of said walls and the adjacent side of said slide member being provided with complementary spaced parallelly related guide devices extending at right angles to said shank, said slide member being formed with an opening extending longitudinally thereof, one end portion of said opening being provided with screw threads, an operating member bodily supported in said opening and provided at one end with screw threads engaging the threads in said opening, the opposite end of said operating member having bearing in the other end portion of said opening and the outer side of said slide member being formed with a seat for the shank of a tool the axis of which seat traverses a plane intersecting the axis of said first mentioned shank during movement of said slide member, and interengaging devices between one of said walls and said operating member for preventing endwise movement of the latter.

2. In a tool mounting, the combination of a shank adapted to be supported in a machine and provided at its outer end with a guide wall extending at right angles to said shank, a separate guide wall fixed at its inner and outer ends to said first mentioned wall, a slide member slidably mounted between said guide walls, one of said walls and the adjacent side of said slide member being provided with complementary guide devices spaced in parallel relation and extending at right angles to said shank, said slide member being formed with an opening extending longitudinally thereof, said opening having a laterally extending portion intermediate its ends and one end portion thereof being provided with screw threads, an operating member bodily supported in said opening and formed intermediate its ends with an annular recess, one end of said operating member being provided externally with screw threads engaging the threads in said opening and its opposite end having bearing in the other end portion of said opening and the outer side of said slide member being formed with a seat for the shank of a tool the axis of which seat traverses a plane intersecting the axis of said first mentioned shank during movement of said slide member, and a device carried by one of said walls and extending through the lateral portion of said opening into the annular recess in said operating member for engagement with the side walls of said recess to prevent endwise movement of said operating member.

3. In a tool mounting, the combination of a shank adapted to be supported in a machine and provided at its outer end with a guide wall extending at right angles to said shank, a separate guide wall fixed at its inner and outer ends to said first mentioned wall, a slide member slidably mounted between said guide walls, one of said walls and the adjacent side of said slide member being provided with complementary guide devices spaced in parallel relation and extending at right angles to said shank, said slide member being formed with an opening extending longituinally thereof, which opening is enlarged laterally intermediate its ends to form spaced shoulders and one end portion thereof being provided with screw threads, an operating member mounted in said opening and formed intermediate its ends with an annular recess, one end of said operating member being provided externally with screw threads engaging the threads in said opening, the opposite end of said operating member having bearing in the other end portion of said opening and the outer side of said slide member being formed with a seat for the shank of a tool the axis of which seat traverses a plane intersecting the axis of said first mentioned shank during movement of said slide member, and a device carried by one of said guide walls and disposed between and in engagement with the side walls of the annular recess in said operating member to prevent endwise movement of the latter and in the path of movement of said shoulders to limit the movement of said slide member in either direction.

4. In a tool mounting, the combination of a shank adapted to be mounted in a machine and provided at its outer end with an integral base member formed with a recess extending at right angles to said shank, the bottom wall of said recess being disposed in a plane parallel to but at one side of the axis of said shank and forming with the end walls of said recess a guide way, a guide member fixed at its inner and outer ends to the end walls of said recess and having a guide surface parallel to the bottom wall of said recess disposed on the opposite side of the axis of said shank, a slide mounted in and slidably engaging the walls of said recess and said guide surface, said slide being formed with an opening extending longitudinally thereof and one end portion of said opening being provided with screw threads, a rotatable device mounted in said opening and provided externally at one end with screw threads engaging the threads in said opening and having bearing in the opposite end portion of said opening, the outer side of said slide being formed with a seat for the shank of a tool, the axis of which seat traverses a plane cutting the axis of said first mentioned shank during movement of said slide, and interengaging means between one of said members and said device for preventing endwise movement of the latter.

5. A mounting as claimed in claim 4 wherein means are provided for flexing the wall of said guide member for increasing the friction between its guide surface and said slide.

6. A mounting as claimed in claim 4 wherein said guide member is formed with a through opening the inner face of which is substantially parallel to said guide surface and means are provided for flexing the wall of said guide member between said inner face of said through opening and said guide surface for increasing the friction between the latter and said slide.

MICHAEL D. DZAMA.